Feb. 11, 1930. G. H. SCHOEN 1,746,797
VALVE CLEARANCE ADJUSTING DEVICE FOR AUTOMOBILE ENGINES
Filed Oct. 12, 1927
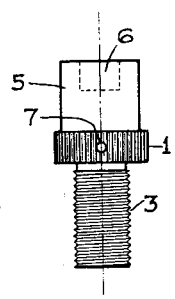
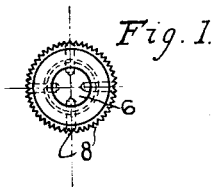
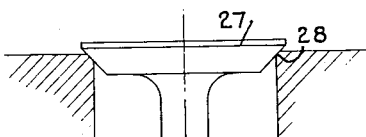
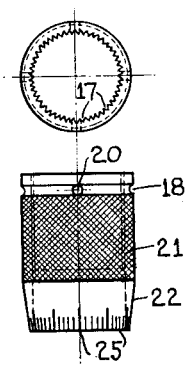
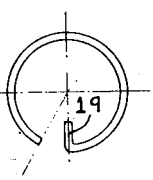
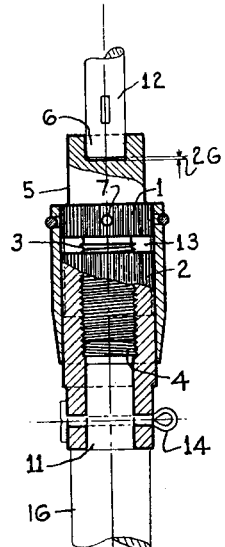
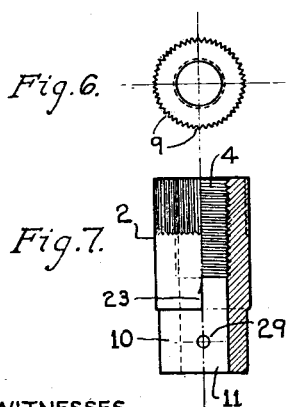
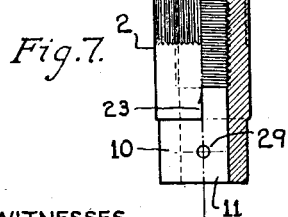
INVENTOR
George H. Schoen.
BY
ATTORNEY
WITNESSES Patented Feb. 11, 1930

1,746,797

UNITED STATES PATENT OFFICE

GEORGE HENRY SCHOEN, OF NEW YORK, N. Y.

VALVE-CLEARANCE-ADJUSTING DEVICE FOR AUTOMOBILE ENGINES

Application filed October 12, 1927. Serial No. 225,786.

This invention relates to improvements in valve clearance adjusting devices for automobile engines.

The principal object of the invention is to provide a simple device of a character whereby the necessary clearance due to expansion of the valve material and wear of the valve and the valve seat may be easily and accurately adjusted to the one thousandth part of an inch.

Another object is to make and lock this adjustment without the aid of any machinist tools.

Other objects and advantages will be apparent from the following description and with particular reference to the accompanying drawings.

In the drawings: Figure 1 is the top view of the adjusting screw, Figure 2 is the side elevation of the adjusting screw, Figure 3 is the top view of the locking and indexing sleeve, Figure 4 is the side elevation of the locking and indexing sleeve. Figure 5 is the lock spring. Figure 6 is the top view of the adjusting nut. Figure 7 is the side elevation of the adjusting nut. Figure 8 is a sectional view of the valve clearance adjusting device assembled. Figure 9 is an elevation of the valve clearance adjusting device showing the location of said invention on an automobile engine of the L head type.

Referring particularly to the accompanying drawings, the device consists of a valve clearance adjusting screw which is formed of a single piece of metal. The screw threading 3 is (S A E) Standard Automobile Engineers form twenty to the inch having a lead of .05". The body 1 has fifty V grooves 8 formed on its cylindrical surface parallel to the vertical axis of valve stem 12. The four holes 7 in body 1 are drilled normal to vertical axis and ninety degrees apart on circular horizontal plane and are adapted to receive the lock spring pin 19. These four holes align with the four holes of the indexing and locking sleeve; the head 5 being of a diameter slightly less than the root diameter of V grooves 8 having a recess 6 adapted to receive valve stem 12.

The valve adjusting nut is formed of a single piece of metal. The nut 4 threading is (S A E) Standard Automobile Engineers form twenty to the inch with a lead of .05" fitting screw 3 snugly. The bore 11 is adapted to receive valve push rod 16 which is lifted by a cam 15. The cylindrical surface 2 has fifty V grooves 9 formed identical in cross section to grooves 8 on surface 1 but being about twice their length. The indexing arrow 23 on surface 2 is engraved directly in line with a vertex of a V formed by two V grooves 9 and parallel to vertical axis of valve stem 12. The cylindrical surface 10 has a diameter slightly less than surface 2 with hole 29 in center and normal to vertical axis and penetrating both sides for receiving a split cotter pin 14.

The locking and indexing sleeve is formed of a single piece of metal having fifty V grooves 17 formed on the interior surface 13 meshing snugly with grooves 8 of the adjusting screw and grooves 9 of adjusting nut when in use. The circumferential U groove 18 is adapted to receive the lock spring, having four holes 20 drilled normal to vertical axis and ninety degrees apart on circular horizontal plane for passing lock spring pin 19 through to a hole 7 in the body 1 of adjusting screw when locking the adjustment. The cylindrical surface 21 is knurled to afford a grip for the fingers when making an adjustment. The surface 22 is slightly tapered having fifty indexing graduations 25 aligning with the vertices formed at the root diameter by the fifty V grooves 17 on the interior surface 13. Each space between the graduations is the equivalent of one thousandth part of an inch. Every fifth index graduation is engraved slightly longer to aid making calculations to the right or left of index arrow 23 on surface 2 when making an adjustment.

The lock spring is made of a light spring steel wire of a round cross section and wound circular in form to fit groove 18 tightly, having a pin 19 bent in the plane of the spring and normal to the horizontal axis. The length of the pin 19 is one quarter of the spring diameter fitting hole 20 of the locking and indexing sleeve and hole 7 of the adjusting screw snugly.

*Example.*—It is necessary to adjust valve so that the clearance 26 is .005".

*Solution.*—Refer to drawings.

After valve 27 is closed as shown by 28 and the push rod 16 is at its lowest position as shown by cam 15 or ascertained by the engine timing mechanism, remove the lock spring pin 19. Slide the locking and indexing sleeve up disengaging surface 13 from the grooves 9 of the adjusting nut. The locking and indexing sleeve engages the same grooves 8 on body 1 of the adjusting screw at all times. Therefore, by turning the locking and indexing sleeve to the right we also turn the adjusting screw to the right until we feel the clearance 26 is .000". Then slide the locking and indexing sleeve down engaging grooves 9 of the adjusting nut. Read the location of one of the long index graduations to the right or left of the arrow 23. The clearance 26 is still .000". Slide the locking and indexing sleeve up again disengaging grooves 9 of the adjusting nut. Turn the locking and indexing sleeve five index spaces to the left; the screw lead being .05" and by turning the screw one tenth of a revolution the screw advances .005" giving the desired clearance. Slide the locking and adjusting sleeve down engaging grooves 9 of the adjusting nut so that the index graduation sighted aligns with arrow 23.

Replace lock spring so that the pin 19 passes through hole 20 of the locking and indexing sleeve and lodges in the hole 7 of the adjusting screw. By using this method, any valve clearance may be obtained.

Prior to my invention, the valve clearance adjusting devices for the automobile engines comprised of a valve push rod having a running thread and two nuts at the upper or lower end, the valve clearance adjustment having been made with the aid of a set of gauging feelers and a pair of wrenches. The gauging feeler of a thickness equal to the necessary clearance was placed between the valve stem and the push rod (or valve lifter) or other location that may be adapted for same. Then, with the aid of the two wrenches, the first or check nut was loosened and the necessary adjustment was made with the second nut. The check nut was then brought up tightly against the second nut with the use of the wrenches. The adjustment having been made, the feeler was removed and, invariably the clearance obtained was plus or minus a fraction of the desired amount depending upon the skill of the person making the adjustment.

What I claim is:

1. An adjustable valve-clearance device for permanent incorporation in a valve structure which comprises an adjusting nut having an internally threaded portion and provided on its external periphery with locking grooves, an adjusting screw having external threads to mate with the internally located threads of said nut and provided on its exterior with locking grooves corresponding to the aforesaid locking grooves, and a locking and indexing sleeve slidably mounted on the grooves of the adjusting nut and screw and having indexing graduations provided on the periphery of the sleeve, said sleeve being adapted to be slid upon said grooves to unlock said nut from said screw so that the latter can be turned a selected number of revolutions to space the screw a selected distance from said nut and to establish a selected valve clearance.

2. An adjustable valve-clearance device adapted for permanent incorporation in a valve structure which comprises an adjusting nut having a plurality of parallel grooves on its outer periphery and an internal thread, an indexing arrow incorporated on the outer face of said nut, an adjusting screw having a plurality of parallel grooves mating with the grooves on the nut and provided with external threads capable of screwing into said internal thread, and a hollow locking and indexing sleeve slidably mounted on the parallel grooves of the nut and screw whereby the screw can be rotated a selected amount with respect to the nut when the said sleeve is slid upwards to disengage the grooves of the nut and when the sleeve is slid downwards the nut and screw are locked together in a positive manner.

3. A springless, adjustable valve-clearance device capable of adjustment by the hands of the operator alone and capable of being permanently incorporated in a valve structure which comprises an adjustable screw provided with an external thread of a predetermined pitch at one end thereof, a seat capable of receiving a valve stem incorporated in the top of said screw, a plurality of V-grooves positioned on an intermediate peripheral portion of the said screw, said number of grooves being so correlated with the pitch of said thread that the rotation of the screw through an arc extending from the vertex of one V-groove to that of an adjacent V-groove moves the screw a certain predetermined linear distance, a regulating nut screwed on the thread of said screw, a plurality of V-grooves provided on the said nut and mating with the V-grooves on said screw, visible indexing means on the exterior of said nut, means provided on said nut for fixedly securing it to a valve push rod, and a hollow indexing and positive locking sleeve slidably mounted on the mating grooves of said nut and screw and adapted to lock screw and nut together in a positive manner, said sleeve having indexing graduations located on the periphery thereof and adapted to coact with the indexing means of said nut to give an accurate setting.

4. A springless adjustable valve-clearance device capable of adjustment by the hands of the operator alone and capable of being permanently incorporated in a valve structure which comprises adjustable means provided with a seat for the end of a valve stem, a thread having a predetermined pitch provided at one end of said adjustable means, a plurality of V-grooves incorporated on the exterior of said adjustable means and having a predetermined relation with the pitch of said threads to effect a predetermined, accurate linear movement of said adjustable means when the latter is rotated through an arc equal to that extending from the vertex of one V-groove to that of an adjacent V-groove, fixable means screwed to said first-named means and adapted to be fixedly secured to the upper end of a push rod, a plurality of elongated V-grooves provided on the exterior of said fixable means to mate with the aforesaid V-grooves, hand operated indexing and positive locking means slidably mounted on the V-grooves of both of the aforesaid means to couple them together in a positive manner during normal operation of the valve structure and to uncouple them when the valve clearance is to be adjusted, said indexing means being rotatable with the first-named means alone during regulation of the valve clearance, graduations provided on said indexing means to coincide with the outermost vertices of the V-grooves to facilitate accurate adjustment and to accurately establish a selected valve clearance, and hand-removable locking means for rigidly securing said indexing means to the first-named means in a positive manner during normal operation of the valve structure.

5. A springless, hand adjustable valve-clearance device capable of adjustment by the hands of the operator alone and capable of being permanently incorporated in a valve structure which comprises an adjustable screw having a seat at its upper end for receiving the end of a valve stem, a thread having twenty threads per linear inch provided at the lower end of the screw, fifty axially parallel grooves incorporated on the outside of the screw, a plurality of locking holes provided in an intermediate peripheral portion, a nut member for receiving the end of a push rod screwed on to the aforesaid thread and provided on its exterior with fifty axially parallel, elongated V-grooves mating with the aforesaid V-grooves of the screw, visible indexing means provided on the nut and aligned with an outermost vertex of one of its V-grooves, positive fastening means for securing the nut to a valve push rod, a hollow hand-operable positive locking and indexing sleeve slidably mounted on the V-grooves of said screw and said nut and adapted to fixedly couple the screw and the nut together in a positive manner for normal operation and to uncouple them during adjustment of the valve clearance, an annular groove and a plurality of locking holes provided at an upper portion of the said sleeve, said locking holes being adapted to cooperate with the locking holes of the said screw, indexing graduations located at the lower peripheral portion of the sleeve and consisting of fifty graduations coincident with the outermost vertices of the V-grooves on the screw and the nut to permit accurate adjustment of valve clearance to one thousandth of an inch, and a hand-operable, positive locking spring fitting in the annular groove on the said sleeve and provided with a bent pin at its one end to project into the aforementioned locking holes on the said screw and the said sleeve.

In testimony whereof, I affix my signature.

GEORGE H. SCHOEN.